(12) United States Patent
Yang et al.

(10) Patent No.: US 12,130,377 B2
(45) Date of Patent: Oct. 29, 2024

(54) PHASE BASED SEARCH PROCEDURE FOR RADAR DETECTION

(71) Applicant: QUALCOMM Incorporated, San Diego, CA (US)

(72) Inventors: Xinjie Yang, La Jolla, CA (US); Nan Zhang, San Diego, CA (US); Roberto Rimini, San Diego, CA (US); Danlu Zhang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 17/302,295

(22) Filed: Apr. 29, 2021

(65) Prior Publication Data

US 2022/0357423 A1 Nov. 10, 2022

(51) Int. Cl.
*G01S 7/35* (2006.01)
*G01S 13/58* (2006.01)
*H04W 88/02* (2009.01)

(52) U.S. Cl.
CPC ............ *G01S 7/352* (2013.01); *G01S 13/584* (2013.01); *H04W 88/02* (2013.01)

(58) Field of Classification Search
CPC ....... G01S 7/352; G01S 13/584; H04W 88/02
USPC .......................................................... 342/58
See application file for complete search history.

(56) References Cited

U.S. PATENT DOCUMENTS

| | | | | |
|---|---|---|---|---|
| 2 A * | 7/1836 | Goulding | ............... | D01G 21/00 57/58.49 |
| 5,706,012 A * | 1/1998 | Kay | ....................... | H01Q 21/22 342/372 |
| 9,746,546 B2 * | 8/2017 | Lee | ....................... | G01S 13/584 |
| 9,939,522 B2 * | 4/2018 | Hong | ....................... | G01S 13/42 |
| 9,952,312 B2 * | 4/2018 | Corbett | .................... | G01S 7/023 |
| 10,175,348 B2 * | 1/2019 | Clark | ....................... | G01S 13/42 |
| 10,205,457 B1 * | 2/2019 | Josefsberg | .............. | H03L 7/091 |
| 10,359,504 B2 * | 7/2019 | Fetterman | ............. | G01S 13/343 |
| 10,404,261 B1 * | 9/2019 | Josefsberg | ............ | G01S 13/931 |
| 10,495,750 B1 * | 12/2019 | Musgrove | .............. | G01S 13/904 |
| 10,598,764 B2 * | 3/2020 | Josefsberg | .............. | H03L 7/091 |
| 10,613,208 B2 * | 4/2020 | Ali | .......................... | G01S 7/352 |
| 10,746,852 B2 * | 8/2020 | Adib | ....................... | G01S 13/536 |
| 11,009,599 B2 * | 5/2021 | Mercuri | ................ | G01S 13/726 |
| 11,125,869 B2 * | 9/2021 | Santra | ..................... | G01S 13/72 |

(Continued)

FOREIGN PATENT DOCUMENTS

| | | | | |
|---|---|---|---|---|
| EP | 2983007 A1 * | 2/2016 | ............ | G01S 13/28 |
| EP | 3438693 A1 * | 2/2019 | ............ | G01S 13/26 |

OTHER PUBLICATIONS

International Search Report and Written Opinion—PCT/US2022/071183—ISA/EPO—Jun. 21, 2022.

*Primary Examiner* — Nuzhat Pervin
(74) *Attorney, Agent, or Firm* — QUALCOMM Incorporated

(57) ABSTRACT

In some aspects, a radar device may receive a received signal comprising a reflected frequency modulated continuous wave (FMCW) radar signal and interference. The radar device may identify the reflected FMCW radar signal based at least in part on performing a phase based search procedure to facilitate removing the interference from the received signal. The radar device may perform an action based at least in part on a characteristic of the identified reflected FMCW radar signal. Numerous other aspects are described.

50 Claims, 10 Drawing Sheets

(56) References Cited

U.S. PATENT DOCUMENTS

| | | | |
|---|---|---|---|
| 11,204,410 B2* | 12/2021 | Jansen | G01S 13/34 |
| 11,215,705 B2* | 1/2022 | Kitayama | G01S 7/023 |
| 11,231,481 B1* | 1/2022 | Cohen | G01S 7/2927 |
| 11,454,700 B1* | 9/2022 | DeSalvo | G01S 7/4021 |
| 11,520,008 B2* | 12/2022 | Lee | G01S 7/4052 |
| 11,656,315 B2* | 5/2023 | Stephens | G01S 5/12 |
| | | | 342/387 |
| 11,965,956 B2* | 4/2024 | Wang | G01S 13/42 |
| 2017/0010344 A1* | 1/2017 | Corbett | G01S 7/023 |
| 2017/0234968 A1* | 8/2017 | Roger | G01S 13/343 |
| | | | 342/93 |
| 2017/0243646 A1* | 8/2017 | Shifren | G11C 13/004 |
| 2017/0343646 A1* | 11/2017 | Bechter | G01S 13/931 |
| 2019/0219683 A1* | 7/2019 | Fang | G01S 13/93 |
| 2019/0377077 A1* | 12/2019 | Kitayama | G01S 7/0232 |
| 2019/0383925 A1* | 12/2019 | Gulati | G01S 13/341 |
| 2019/0391247 A1* | 12/2019 | Gulati | G01S 7/0232 |
| 2020/0064996 A1* | 2/2020 | Giusti | G01S 13/88 |
| 2020/0088863 A1* | 3/2020 | Ootaka | G01S 11/02 |
| 2020/0101889 A1* | 4/2020 | Iwai | G01S 13/931 |
| 2020/0256948 A1* | 8/2020 | Jansen | G01S 13/34 |
| 2020/0371247 A1* | 11/2020 | Marmet | G01S 19/015 |
| 2021/0149019 A1* | 5/2021 | Subburaj | G01S 7/40 |
| 2021/0156984 A1* | 5/2021 | Campbell | G05D 1/0257 |
| 2021/0373127 A1* | 12/2021 | Slobodyanyuk | G06F 17/16 |
| 2022/0140941 A1* | 5/2022 | Gulati | G01S 7/021 |
| | | | 370/328 |

* cited by examiner

PHASE BASED SEARCH PROCEDURE FOR RADAR DETECTION

FIELD OF THE DISCLOSURE

Aspects of the present disclosure generally relate to radar technologies and, for example, to phase based search procedures for radar detection.

BACKGROUND

A radar device is a type of sensor device that may be used to detect a target, determine characteristics of the target, and/or the like. Radar devices may be used in vehicles and may be used to determine characteristics associated with a vehicle and/or characteristics associated with an environment of the vehicle. For example, a radar device may be configured to detect proximity to an object, roadway information, a location of the vehicle (e.g., relative to a target), and/or the like.

SUMMARY

In some aspects, a method performed by a radar device includes receiving a received signal comprising a reflected frequency modulated continuous wave (FMCW) radar signal and interference; identifying the reflected FMCW radar signal based at least in part on performing a phase based search procedure to facilitate removing the interference from the received signal; and performing an action based at least in part on a characteristic of the identified reflected FMCW radar signal.

In some aspects, a radar device for wireless communication includes a memory and one or more processors, coupled to the memory, configured to: receive a received signal comprising a reflected FMCW radar signal and interference; identify the reflected FMCW radar signal based at least in part on performing a phase based search procedure to facilitate removing the interference from the received signal; and perform an action based at least in part on a characteristic of the identified reflected FMCW radar signal.

In some aspects, a non-transitory computer-readable medium storing a set of instructions for wireless communication includes one or more instructions that, when executed by one or more processors of a radar device, cause the radar device to: receive a received signal comprising a reflected FMCW radar signal and interference; identify the reflected FMCW radar signal based at least in part on performing a phase based search procedure to facilitate removing the interference from the received signal; and perform an action based at least in part on a characteristic of the identified reflected FMCW radar signal.

In some aspects, an apparatus for wireless communication includes means for receiving a received signal comprising a reflected FMCW radar signal and interference; means for identifying the reflected FMCW radar signal based at least in part on performing a phase based search procedure to facilitate removing the interference from the received signal; and means for performing an action based at least in part on a characteristic of the identified reflected FMCW radar signal.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
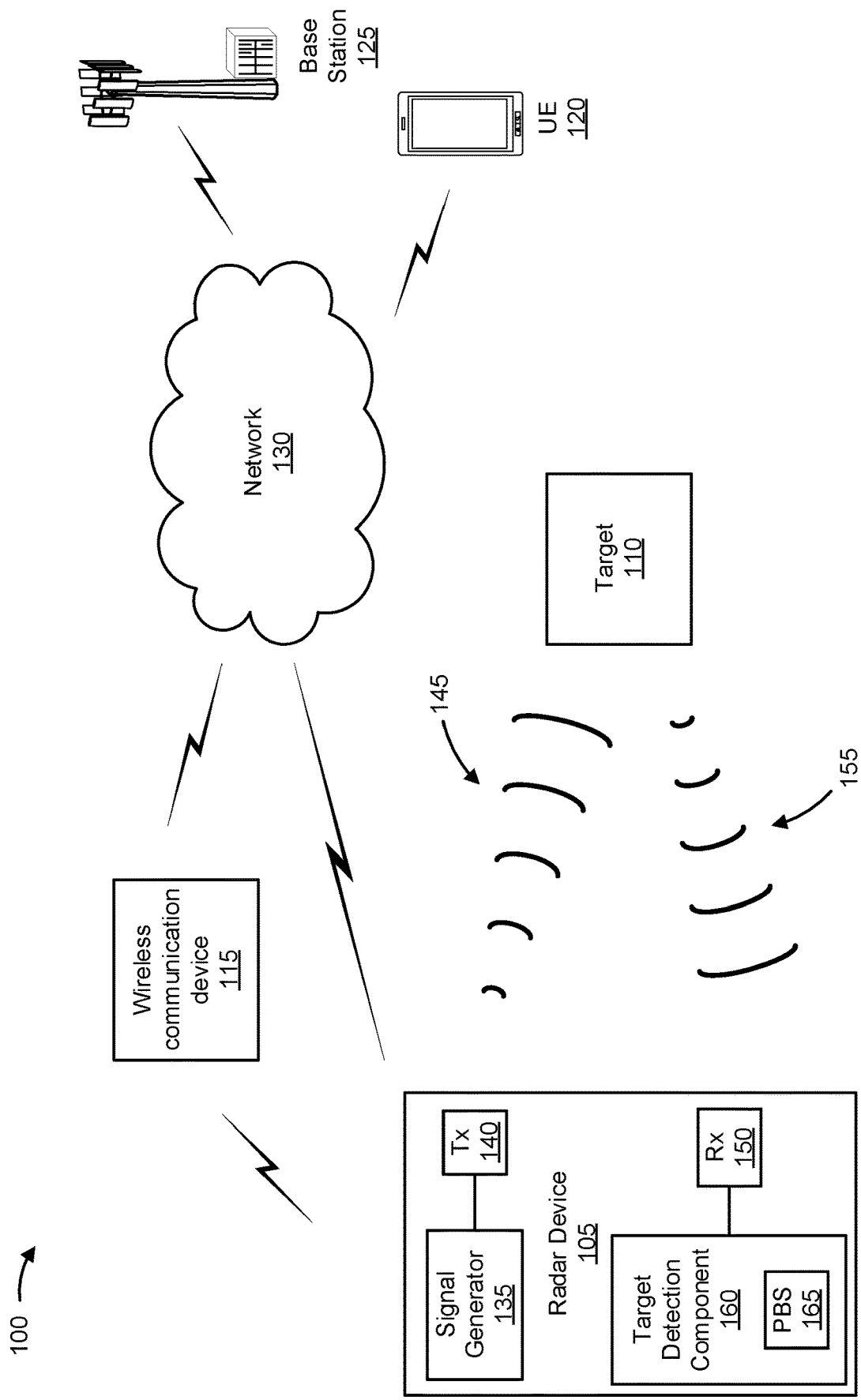
FIG. 1 is a diagram illustrating an example environment in which a phase based search procedure for radar detection described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some instances, frequency modulated continuous wave (FMCW) radar may be used to detect particular targets. FMCW radar uses a linear frequency modulated signal to obtain range. A received signal is mixed with the transmitted signal to obtain the beat frequency between the two. The beat frequency is a function of the round-trip time to the reflecting target, and therefore can be mapped directly to its range. Beamforming associated with multiple receiver channels may be used to determine direction of arrival (DoA) of a received signal, which may correlate to a target's azimuthal location. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) making up polar space, and the third dimension (Doppler radial velocity) containing velocity information.

In some cases, for example, an FMCW based radar device may be used to detect the presence of human tissue near the device. The FMCW based radar device may be a user equipment (UE) and may use FMCW radar to detect human tissue nearby to facilitate compliance with maximum permissible exposure guidelines. However, a receiver of an FMCW based radar device may experience interference in the form of mutual coupling between the transmitter and receiver. The mutual coupling may be stronger than the reflected signal and may result, for example, from leakage in a chipset and/or over-the-air electromagnetic propagation.

To mitigate mutual coupling, the radar device may cancel the interference. To cancel the interference, the radar device may determine a timing estimation associated with the interference. In some cases, a correlation based searcher can be used to search a received signal for the interference. However, a correlation based searcher is based on correlation results from correlating a reference signal with a received signal. The reference signal is updated from a feedback loop. Thus, since there may be jitter in the timing of the reference signal, a single inaccurate reference signal can cause the peak of the correlation results to shift to a wrong location, thereby making identification of the interference difficult or impossible. As a result, a radar device may trigger unnecessary actions based on false detection of a target, fail to trigger actions that should be triggered in the presence of a target based on a failure to detect the target due to the presence of interference, transmit additional radar chirps in an attempt to distinguish a target thereby increasing processing and communication resource consumption, and/ or the like.

Some implementations described herein enable use of a phase based search procedure that may facilitate more accurately determining timing of interference. For example, a radar device may receive a received signal that includes a reflected FMCW radar signal and interference. The radar device may identify the reflected FMCW radar signal based at least in part on performing a phase based search procedure to facilitate removing the interference from the received signal. The phase based search procedure does not rely on a reference signal to operate, and thus does not compound error like a correlation based searcher. Thus, some aspects of the phase based searcher may be more robust and error tolerant than a correlation-based searcher. In this way, aspects disclosed herein may facilitate distinguishing between interference and targets with more reliability. As a result, some aspects may facilitate reducing processing and communication resource consumption and having a positive impact on device performance.

Although some examples are described herein in connection with one or more radar devices being used in a UE-based wireless communication environment, the one or more radar devices may similarly be utilized and/or designed for other types of example environments (e.g., roadway environments, marine environments, and/or aerospace environments, among other examples).

FIG. 1 is a diagram of an example environment 100 in which systems and/or methods described herein may be implemented. As shown in FIG. 1, the environment 100 may include a radar device 105 and a target 110. The environment 100 also may include a wireless communication device 115, a UE 120, and a base station 125. Two or more of the radar device 105, the wireless communication device 115, the UE 120, and the base station 125 may communicate with one another via a network 130. The radar device 105 may be, be integrated with, be implemented in, or include a wireless communication device (such as, or similar to, the wireless communication device 115), a base station (such as, or similar to, the base station 125), or a UE (such as, or similar to, the UE 120). In some aspects, the radar device 105 may include a standalone radar device.

The network 130 may be one or more wired networks, one or more wireless networks, or a combination thereof. A wireless network 100 may be or may include elements of a 3G network, a 4G network, a 5G (New Radio (NR)) network, a Long Term Evolution (LTE) network, and/or a 6G network, among other examples. The wireless communication device 115 may be a base station, a UE, a relay device, and/or any other type of device capable of wireless communication. A base station may include a Node B, a gNB, a 5G node B (NB), an access point, a transmit receive point (TRP), and/or the like.

The UE 120 may be stationary or mobile. A UE may also be referred to as an access terminal, a terminal, a mobile station, a subscriber unit, a station, and/or the like. A UE may be, include, or be included in a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a radar device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). The UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

The radar device 105 includes one or more devices capable of generating, transmitting, receiving, storing, processing, and/or providing information associated with transmitted FMCW radar signals, received signals, and/or the like. The target 110 may be any object capable of reflecting at least a portion of a radar signal.

As shown, the radar device 105 may include a signal generator 135 that generates an FMCW radar chirp. In some aspects, the FMCW radar chirp may be generated based at least in part on a first set of transmission parameter values. A set of transmission parameter values may indicate a starting frequency, a slope (rate of change of frequency), an initial phase, a power, an amplitude, a periodicity (time interval between chirps), and/or the like.

As shown in FIG. 1, the radar device 105 may include a transmit chain (Tx) 140 that generates and transmits an FMCW radar signal 145 based at least in part on the FMCW radar chirp. In some aspects, the transmit chain 140 may include any type of transmission chain configured to receive one or more FMCW radar chirps and transmit a resulting radar signal 145. As shown in FIG. 1, the radar device 105 may include a receive chain (Rx) 150. In some aspects, the receive chain 150 may be configured to receive a received signal 155, components of the received signal 155, and/or the like. As shown, for example, the received signal 155 may include a reflection, off of the target 110, of the transmitted FMCW radar signal 145. In some aspects, the received signal 150 may include interference. The interference may include, for example, one or more interference signals such as mutually coupled transmissions.

As shown in FIG. 1, the radar device 105 may include a target detection component 160 configured to detect the radar target 110 based at least in part on a received signal 155 corresponding to the FMCW radar signal 145. As shown, the target detection component 160 may include a phase based searcher (shown as "PBS") 165. The phase based searcher may include one or more components of the radar device 105 configured to identify a reflected FMCW radar signal based at least in part on performing a phase based search procedure, as described herein.

In some aspects, as described below in connection with FIGS. 4-10, the radar device 105, using the phase based searcher, may determine a phase profile of the received signal 155 corresponding to a phase search range. The phase search range may be based at least in part on a hardware capability associated with the radar device 105. The phase profile may represent a plurality of phases of a plurality of time domain samples over a time period corresponding to a transmitted FMCW radar chirp. The radar device 105 may detect a turnaround point of the phase profile, and may identify the reflected FMCW radar signal based at least in part on the turnaround point.

To determine the phase profile, the radar device 105 may determine a plurality of phase angles comprising a phase angle for each signal sample of a plurality of signal samples of the received signal 155. The radar device 105 may correct the plurality of phase angles by adding a correction factor to a phase angle of the plurality of phase angles based at least in part on determining that an absolute jump between the phase angle and an adjacent phase angle satisfies a jump tolerance threshold.

In some aspects, the radar device 105 may detect the turnaround point by determining a phase differential sequence of the phase profile based at least in part on a sliding window and detecting a differential transition point based at least in part on the phase differential sequence, where the differential transition point corresponds to the turnaround point. The phase differential sequence may include a sequence of values of one and negative one, and detecting the turnaround point may include detecting the turnaround point based at least in part on a sign flip transition point index and a ramp ratio. In some aspects, the radar device 105 may determine the phase differential sequence by determining, for a sample point corresponding to a first time instance, a sign of a difference between a phase value at the sample point and a phase value at a second time instance, where the second time instance is separated from the first time instance by a length of the sliding window.

In some aspects, the sign of the difference between the phase value at the sample point and a phase value at a second time instance may be based at least in part on a relationship between the time instance, a chirp length, and a turnaround time. In some aspects, the sign flip transition point index may correspond to a detection point instance that is based at least in part on a difference between half of the chirp length and the length of the sliding window. The radar device 105 may determine the sign flip transition point index based at least in part on applying a moving average window to the phase differential sequence. The radar device 105 may identify a starting point of a frequency ramp corresponding to the transmitted FMCW radar chirp by identifying the reflected FMCW radar signal based at least in part on the starting point of the frequency ramp corresponding to the transmitted FMCW radar chirp.

In some aspects, the radar device 105 may identify the starting point of the frequency ramp by determining an end point of the frequency ramp based at least in part on the turnaround point and determining a time period that ends at the end point of the frequency ramp and that has a length corresponding to a length of a frequency ramp of the transmitted FMCW radar chirp. The radar device 105 may extract a truncated set of sample points based at least in part on the turnaround point.

In some cases, the radar device 105, using the phase based searcher 165, may determine a capture quality associated with the truncated sample points. To determine the capture quality, the radar device 105 may be configured to determine a first ratio of values of one (1) associated with a subset of the truncated set of sample points corresponding to a first time period prior to the turnaround point to a length of the first time period, determine a second ratio of values of negative one (−1) associated with a subset of the truncated set of sample points corresponding to a second time period after the turnaround point to a length of the second time period, and determine that at least one of the first ratio or the second ratio satisfies a ratio threshold. The radar device 105 may discard the truncated set of sample points based at least in part on determining that at least one of the first ratio or the second ratio satisfies the ratio threshold.

In some aspects, the radar device 105, using the phase based searcher 165, may perform an action such as determining timing information associated with the reflected FMCW radar signal. In some aspects, the radar device 105 may identify the interference based at least in part on the timing associated with the reflected FMCW radar signal.

The radar device 105 may remove the interference from the received signal. In some aspects, the radar device 105 may detect the target 110, output an indication of the detection of the radar target 110, and/or alter a transmission parameter, among other examples.

The number and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
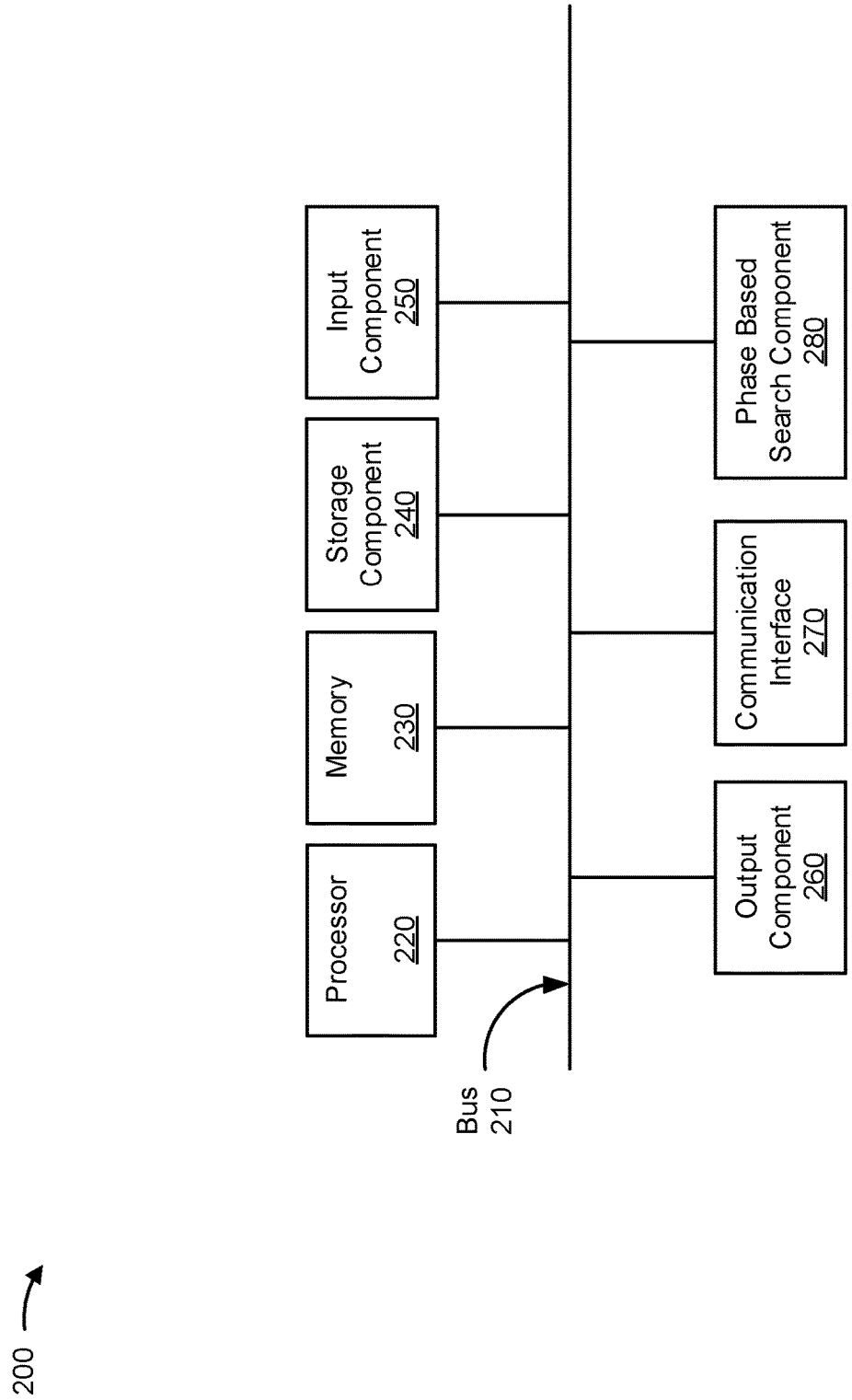
FIG. 2 is a diagram illustrating example components of one or more devices shown in FIG. 1, such as a radar device, in accordance with the present disclosure.

FIG. 2 is a diagram illustrating example components of a device 200, in accordance with the present disclosure. Device 200 may correspond to a radar device (e.g., the radar device 105 depicted in FIG. 1). In some aspects, the radar device 105 may include one or more devices 200 and/or one or more components of device 200. The device 200 may facilitate aspects of using a combined frequency modulated continuous wave (FMCW) radar signal to detect a target, as described below in connection with FIGS. 3-9. As shown in FIG. 2, device 200 may include a bus 210, a processor 220, a memory 230, a storage component 240, an input component 250, an output component 260, a communication interface 270, and/or a phase based search component 280. The phase based search component 280 may be, include, be included in, or be similar to the phase based searcher 165 shown in FIG. 1.

The bus 210 includes a component that permits communication among the components of device 200. The processor 220 may be implemented in hardware, software, or a combination of hardware and software. The processor 220 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, the processor 220 may include one or more processors capable of being programmed to perform one or more functions. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of non-transitory computer-readable medium. The storage component 240 may include a non-transitory computer-readable medium along with a corresponding drive. In some aspects, the storage component 240 may include, be included in, or be integrated with the memory 230.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a component for determining a position or a location of the device 200 (e.g., a global positioning system (GPS) component, a global navigation satellite system (GNSS) component, and/or the like), a sensor for sensing information (e.g., an accelerometer, a gyroscope, an actuator, another type of position or environment sensor, and/or the like), and/or the like. In some aspects, the input component 250 may include a receive chain (e.g., the receive chain 150, and/or the like) and/or one or more components thereof, a target detection component (e.g., the target detection component 160) and/or one or more components thereof, and/or the like.

The output component 260 may include a component that provides output information from the device 200 (e.g., a display, a speaker, a haptic feedback component, an audio or visual indicator, and/or the like). In some aspects, the output component 260 may include a transmission chain (e.g., the transmission chain 140, and/or the like) and/or one or more components thereof, a signal generator (e.g., the signal generator 135, and/or the like) and/or one or more components thereof, and/or the like.

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like. In some aspects, the communication interface 270 may enable the device 200 to perform an action based at least in part on detecting a target, as described above in connection with FIG. 1.

The phase based search component 280 may include a software component, a hardware component, or a combination thereof, that is configured to perform one or more phase based search procedures, as described herein. The phase based search component 280 may be included in, or include one or more aspects of, the processor 220, the memory 230, the storage component 240, the input component 250, the output component 260, and/or the communication interface 270.

The device 200 may perform one or more processes described herein. The device 200 may perform these processes based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or storage component 240 from another computer-readable medium or from another device via the communication interface 270. When executed, software instructions stored in the memory 230 and/or the storage component 240 may cause the processor 220 to perform one or more processes described herein. Thus, for example, software instructions may include, be included in, or otherwise contribute to the instantiation and function of a transmit chain (e.g., the transmit chain 140 and/or the like), a signal generator (e.g., the signal generator 135, and/or the like), a receive chain (e.g., the receive chain 150, and/or the like), a target detection component (e.g., the target detection component 160, and/or the like), and/or a phase based searcher (e.g., the phase based searcher 165, and/or the like), among other examples.

Additionally, or alternatively, hardwired circuitry may be used in place of, or in combination with, software instructions to perform one or more processes described herein. Thus, aspects described herein are not limited to any specific combination of hardware circuitry and/or software.

In some aspects, device 200 includes means for performing one or more processes described herein and/or means for performing one or more operations of the processes described herein. For example, device 200 may include means for receiving a received signal comprising a reflected FMCW radar signal and interference; means for identifying the reflected FMCW radar signal based at least in part on performing a phase based search procedure to facilitate removing the interference from the received signal; and/or means for performing an action based at least in part on a characteristic of the identified reflected FMCW radar signal. In some aspects, such means may include one or more components of the device 200 described in connection with FIG. 2, such as the bus 210, the processor 220, the memory 230, the storage component 240, the input component 250, the output component 260, the communication interface 270, the phase based search component 280, and/or the like.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
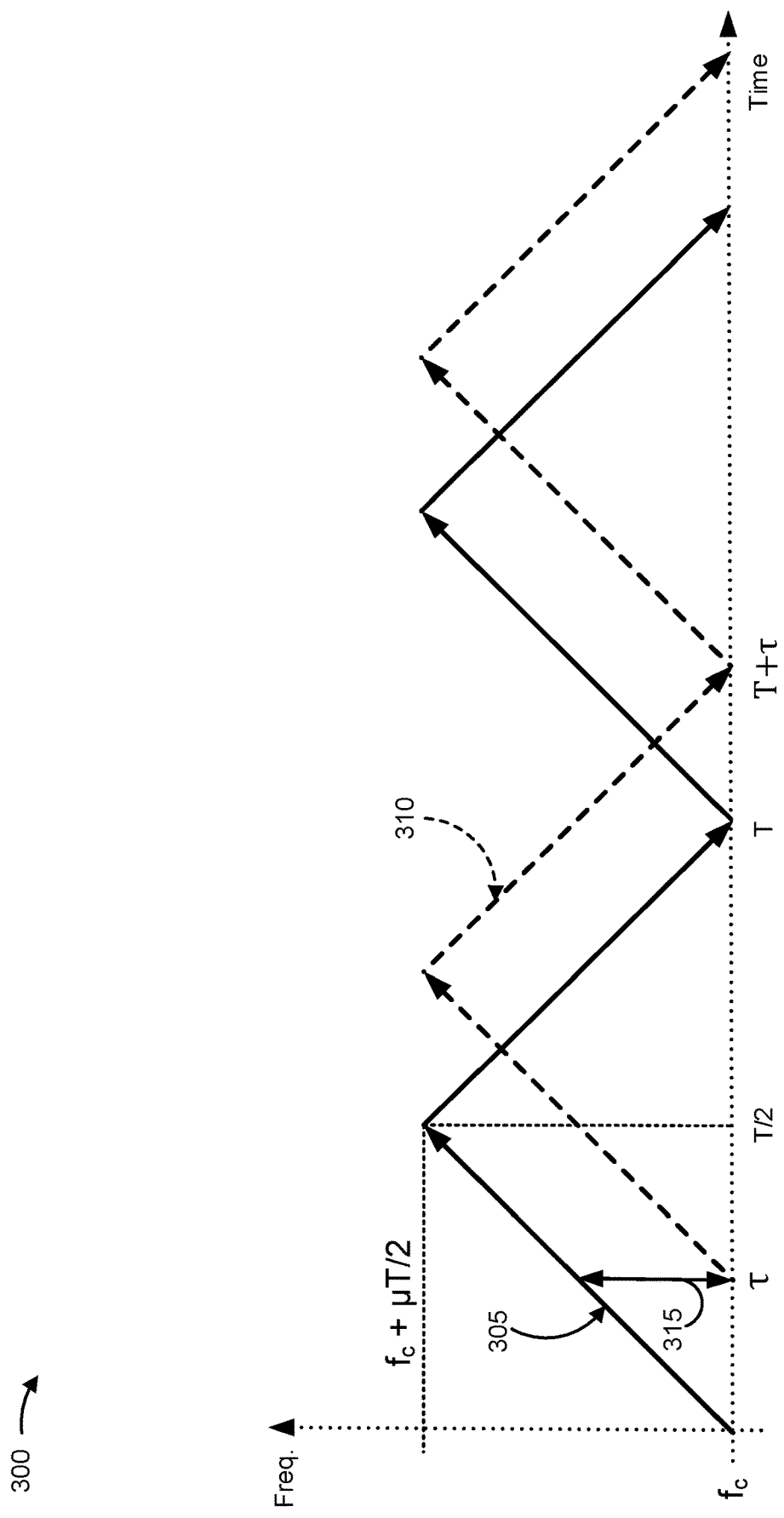
FIGS. 3-4, 5A-5D, and 6-9 are diagrams illustrating examples associated with a phase based search procedure for radar detection, in accordance with the present disclosure.

FIG. 3 is a diagram illustrating an example 300 associated with a phase based search procedure for radar detection, in accordance with the present disclosure. Example 300 illustrates repetitions of an FMCW chirp 305 (as shown by the solid arrows above the "time" axis) in terms of frequency over time, and of a reflected FMCW radar signal 310 (as shown by the dashed arrows above the "time" axis).

In some aspects, for example, a single instance of the FMCW chirp 305 may be represented by a pair of arrows—a rising arrow representing an increase from a first frequency value, $f_c$, to a second frequency value, $f_p = f_c + \mu T/2$, and an immediately subsequent falling arrow, indicating a decrease from the second frequency value to the first frequency value. Similarly, a single instance of the reflected signal 310 may be represented by a pair of arrows—a rising arrow representing an increase from a first frequency value to a second frequency value and an immediately subsequent falling arrow, indicating a decrease from the second frequency value to the first frequency value.

In some aspects, the FMCW chirp 305 may be generated using a signal generator (e.g., the signal generator shown in FIG. 1 and discussed above in connection therewith, and/or the like) and transmitted using a transmission component (e.g., the transmit chain 140 shown in FIG. 1 and discussed above in connection therewith, and/or the like). In some aspects, the reflected signal 310 may be received as part of a received signal by a reception component (e.g., the receive chain 150 shown in FIG. 1 and discussed above in connection therewith, and/or the like). In some aspects, the reflected signal 310 may be used to detect a target.

FMCW radar uses a linear frequency modulated signal to obtain range. The reflected signal is mixed with the transmitted signal to obtain the beat frequency 315 between the two. The beat frequency may be a difference between an instantaneous frequency of the FMCW chirp 305 and a corresponding instantaneous frequency of the reflected signal 310. The beat frequency may be a function of the round-trip time to the reflecting target, and therefore can be mapped directly to its range. Beamforming associated with multiple receiver channels may be used to determine direction of arrival (DoA) of a received signal, which may correlate to a target's azimuthal location. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a 3D tensor, with the first two dimensions (range and DoA) making up polar space, and the third dimension (Doppler radial velocity) containing velocity information.

The transmitted FMCW chirp 305 may be represented as:

$$R_{tr}(t) = \begin{cases} \exp[j2\pi(f_c + \mu t)t] = \exp(j2\pi f_c t + j2\pi\mu t^2)], & 0 < t \leq \frac{T}{2} \\ \exp\left[j2\pi\left(f_c + \frac{\mu T}{2} - \mu\left(t - \frac{T}{2}\right)\right)t\right] = \\ \cos[j2\pi(f_c + \mu T)t - j2\pi\mu t^2], & \frac{T}{2} < t \leq T/2 \end{cases}$$

The received signal (or signal used for phase search) may include, therefore, a delayed version of the transmitted signal:

$R_{rc}(t) = A\, R_{tr}(t-\tau)$ with a phase term for phase shift at reflection omitted. The received signal may be correlated once with the conjugate of the transmitted signal with a low pass filter to eliminate the $2f_c$ terms to determine a correlation, $R_{rc}(t)R_{tr}^*(t)$. Thus, the correlation may provide:

For $\tau < t < \frac{T}{2}$:

$R_{rc}(t)R_{tr}^*(t) = \exp[j2\pi f_c(t-\tau) + j2\pi\mu(t-\tau)^2]\exp(-j2\pi f_c t - j2\pi\mu t^2) \sim$ $\exp[j(-2\pi f_c \tau - 2\pi 2\mu\tau t + 2\pi\mu\tau^2)] = \exp[j2\pi(-2\mu\tau t - f_c\tau + \mu\tau^2)];$ for $\frac{T}{2} + \tau < t < T$:

$R_{rc}(t)R_{tr}^*(t) =$ $\exp[j2\pi(f_c + \mu T)(t-\tau) - j2\pi\mu(t-\tau)^2]\exp(-j(2\pi f_c + \mu T)t + j2\pi\mu t^2) \sim \exp$ $[-j(2\pi f_c + \mu T)\tau + j2\pi 2\mu\tau t - j2\pi\mu\tau^2] = \exp[j2\pi(2\mu\tau t - (f_c + \mu T)\tau - \mu\tau^2)];$ and For $\frac{T}{2} \leq t \leq \frac{T}{2} + \tau$:

$R_{rc}(t)R_{tr}^*(t) =$ $\exp[j2\pi f_c(t-\tau) + j2\pi\mu(t-\tau)^2]\exp(-j(2\pi f_c + \mu T)t + j2\pi\mu t^2) \sim$ $\exp\left\{j2\pi\left[2\mu t^2 - 2\mu\left(\frac{T}{2} + \tau\right)t - f_c\tau + \mu\tau^2\right]\right\}.$ In some aspects, a phase based search procedure may include analysis of a phase term. In the above example, the time-varying phase term, $\text{Phase}[R_{tr}(t)R_{rc}(t)]$, may be given by:

When $$\tau < t < \frac{T}{2}:$$

Phase $[R_{rc}(t)R_{tr}^*(t)] = -2\mu\tau t - f_c\tau + \mu\tau^2;$ which may have a negative slope $-2\mu\tau$ after smoothing out the $2\pi$ jumps;
when $$\frac{T}{2} + \tau < t < T:$$

Phase $[R_{rc}(t)R_{tr}^*(t)] = 2\mu\tau t - (f_c + \mu T)\tau - \mu\tau^2;$ a positive slope $2\mu\tau$ after smoothing out the $2\pi$ jumps, when $$\frac{T}{2} \le t \le \frac{T}{2} + \tau:$$

Phase $[R_{rc}(t)R_{tr}^*(t)] = 2\mu t^2 - 2\mu\left(\frac{T}{2} + \tau\right)t - f_c\tau + \mu\tau^2;$ which may have a quadratic form: at $$\frac{T}{2},$$

the slope is positive and large: $\mu(T-\tau)$.

At T/2, the slope turns from negative to sharp positive. The location of this point does not depend on $\tau$, thus providing robustness against timing jitter. The sharp change (from $-2\mu\tau$ to $\mu(T-\tau)$ wherein $\tau\ll T$) may facilitate change point detection algorithms.

As indicated above, FIG. 3 is provided as one or more examples. Other examples may differ from what is described with regard to FIG. 3.

Figure 4:
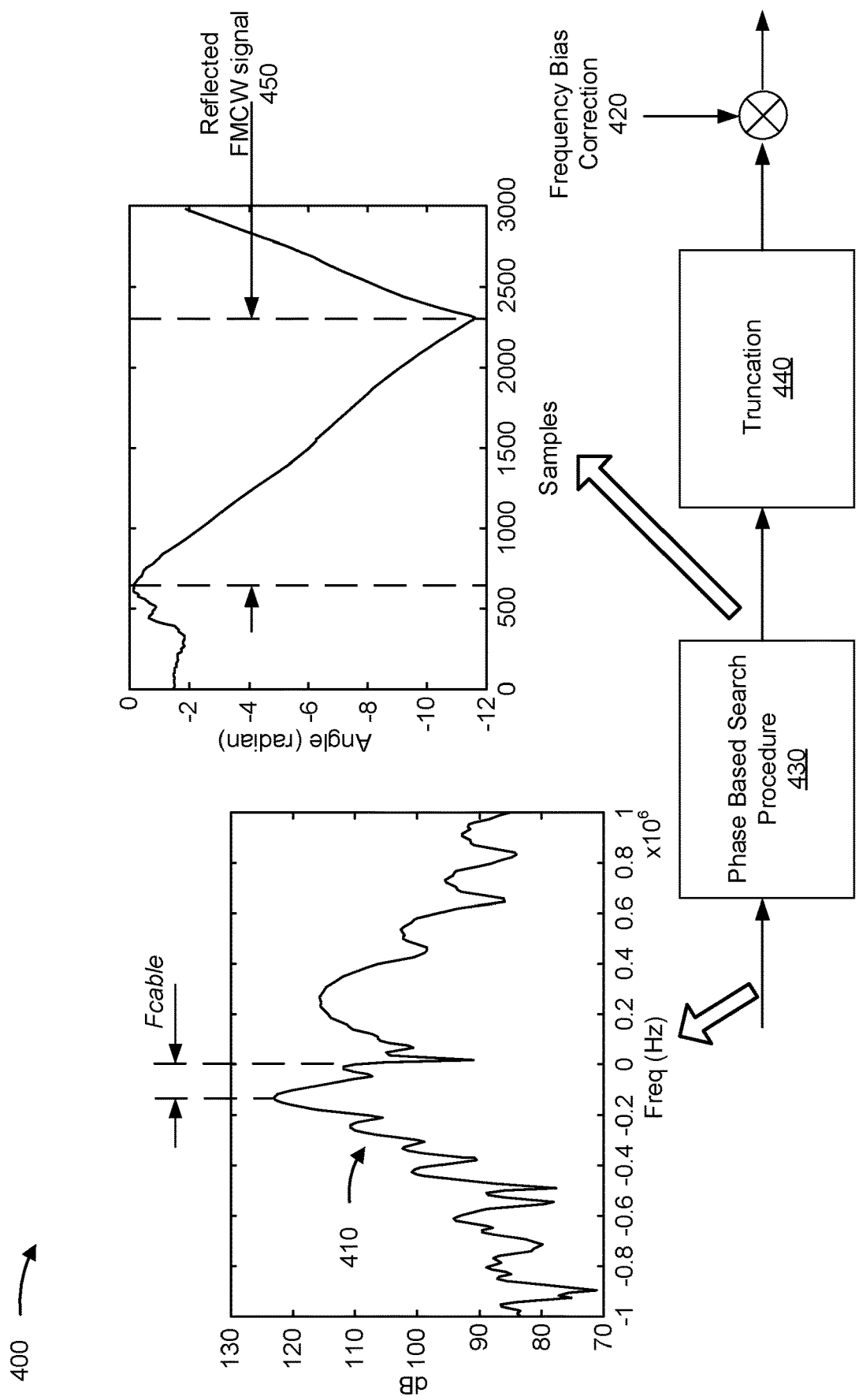
Figure 5:
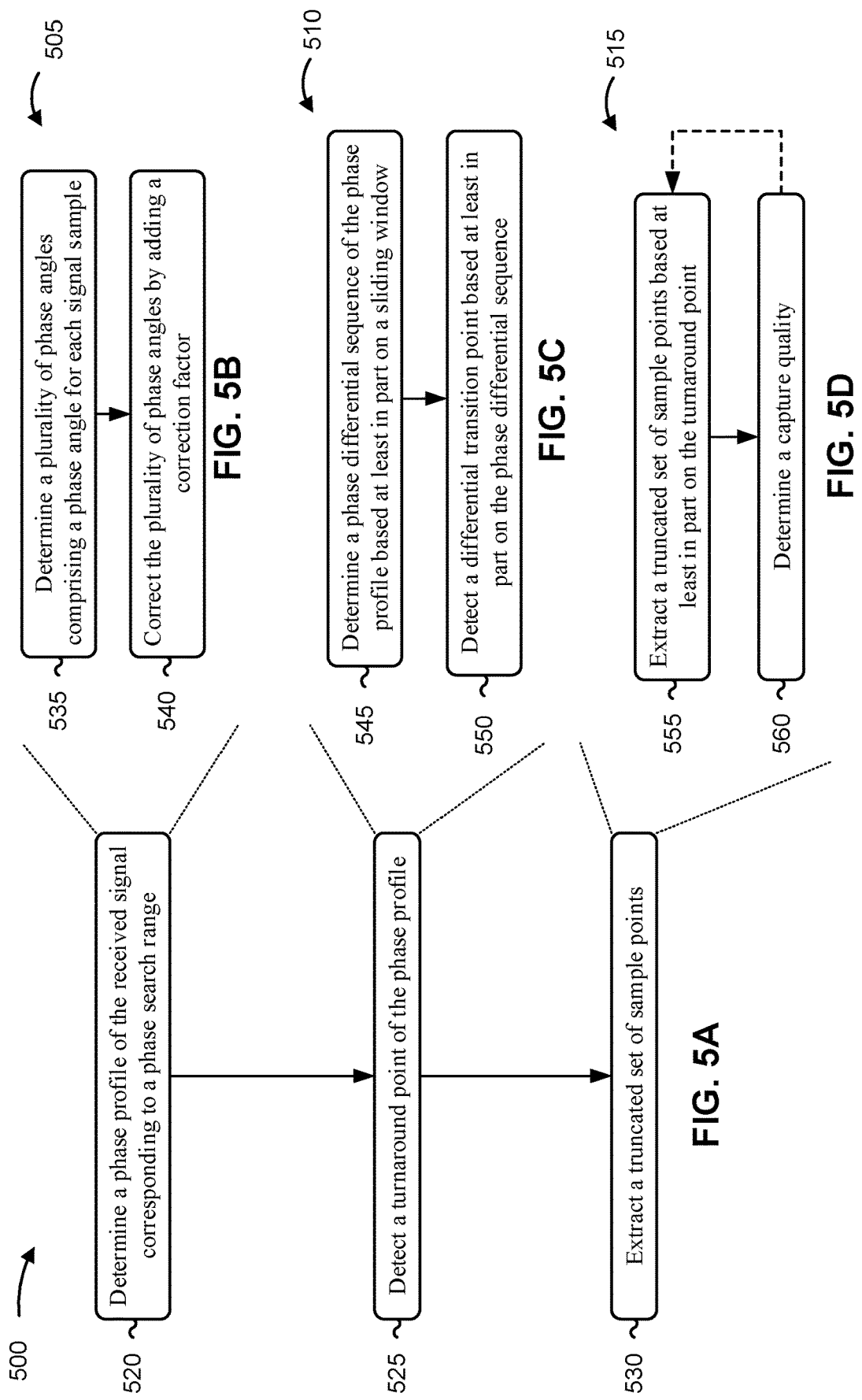

FIG. 4 is a diagram illustrating an example 400 associated with a phase based search procedure for radar detection, in accordance with the present disclosure. As shown, the example 400 illustrates an overall processing approach that may be implemented by a radar device such as, for example, the radar device 105 shown in FIG. 1.

As shown, for example, a received signal 410 may include a frequency bias, $F_{cable}$, that may be corrected by a bias correction operation 420. The frequency bias may be associated with the interference, which may be a mutual coupling signal. Prior to correcting the frequency bias, the radar device may perform a phase based search procedure 430 to extract phase information, and a truncation 440 of the resulting signal to identify a reflected FMCW signal 450. Timing information associated with the interference may be determined based at least in part on the identified reflected FMCW signal 450 and used to identify and subtract the interference from the received signal 410 prior to bias correction 420.

As indicated above, FIG. 4 is provided merely as one or more examples. Other examples may differ from what is described with regard to FIG. 4.

FIGS. 5A-5D are flow diagrams illustrating examples 500, 505, 510, and 515 associated with a phase based search procedure for radar detection, in accordance with the present disclosure. The examples 500, 505, 510, and 515 may be implemented, for example, by a radar device such as the radar device 105 shown in FIG. 1. In some aspects, the examples 500, 505, 510, and 515 may depict illustrative processes for detecting a turnaround point of the phase profile of a received signal and identifying the end point of the up-ramp of the chirp. Once this point is identified, a section of length equal to the number of samples corresponding to $T_p$ may be traced back to identify the starting point of the frequency ramp, which may indicate timing associated with the reflected FMCW signal and/or the interference.

As shown in FIG. 5A, the example 500 illustrates a process for a phase based search procedure for radar detection. As shown, the radar device may determine a phase profile of the received signal corresponding to a phase search range (block 520). In some aspects, the phase profile may represent a plurality of phases of a plurality of time domain samples over a time period corresponding to a transmitted FMCW radar chirp. The phase search range may be based at least in part on a hardware capability associated with the radar device. As is further shown in FIG. 5A, the radar device may detect a turnaround point of the phase profile (block 525). The radar device may extract a truncated set of sample points (block 530).

As shown in FIG. 5B, the example 505 illustrates a process associated with determining a phase profile of a received signal. As shown, the radar device may determine a plurality of phase angles including a phase angle for each signal sample of a plurality of signal samples of the received signal (block 535). For example, in some aspects, for each complex element $z_i$ of the input signal, the phase may be computed by $$\theta_i = a\tan\left(\frac{\text{imag}(z_i)}{\text{real}(z_i)}\right),$$

where $\theta_i$ is the phase angle, in radians. The angle lies between $-\pi$ and $\pi$.

The radar device may correct the plurality of phase angles by adding a correction factor (block 540). In some aspects, the radar device may add a correction factor to each phase angle of the plurality of phase angles based at least in part on determining that an absolute jump between the phase angle and an adjacent phase angle satisfies a jump tolerance threshold. In this way, aspects may be configured to produce smoother phase plots that may be more susceptible to analysis as described herein. For example, in some aspects, phase angles may be corrected by adding multiples of $\pm 2\pi$ when absolute jumps between consecutive elements are greater than or equal to a jump tolerance of $\pi$ radians.

As shown in FIG. 5C, the example 510 illustrates a process associated with detecting a turnaround point of a phase profile. As shown, the radar device may determine a phase differential sequence of the phase profile based at least in part on a sliding window (block 545). In some aspects, the phase differential sequence may include a sequence of values of one (1) and negative one ($-1$). The radar device may determine the phase differential sequence by determining, for a sample point corresponding to a first time instance, a sign of a difference between a phase value at the sample point and a phase value at a second time instance, where the second time instance is separated from the first time instance by a length of the sliding window. In some aspects, the sign of the difference between the phase value at the sample point and a phase value at a second time instance may be based at least in part on a relationship between the time instance, a chirp length, and a turnaround time.

As is further shown in FIG. 5C, the radar device may detect a differential transition point based at least in part on the phase differential sequence (block 550). In some aspects, the differential transition point corresponds to the turnaround point. In some aspects, a sign flip transition point index (e.g., associated with the differential transition point) may correspond to a detection point instance that is based at least in part on a difference between half of the chirp length and the length of the sliding window. In some aspects, for example, the radar device may determine the sign flip transition point index based at least in part on applying a moving average window to the phase differential sequence.

As shown in FIG. 5D, the example 515 illustrates a process associated with extracting a truncated set of sample points, as shown above in FIG. 5A. In some aspects, the radar device may identify the reflected FMCW radar signal based at least in part on extracting a truncated set of sample points based at least in part on the turnaround point (block 555). To extract the truncated set of sample points, the radar device may identify a starting point of a frequency ramp corresponding to the transmitted FMCW radar chirp. In some aspects, for example, the radar device may identify the starting point based at least in part on determining an end point of the frequency ramp based at least in part on the turnaround point and determining a time period that ends at the end point of the frequency ramp and that has a length corresponding to a length of a frequency ramp of the transmitted FMCW radar chirp.

As shown, the radar device may determine a capture quality associated with the extracted (e.g., captured) truncated set of sample points (block 560). In some aspects, the capture quality may indicate an accuracy of the truncated set of sample points. As indicated by the dashed arrow extending from block 560 back to block 555, the radar device may discard the truncated set of sample points based at least in part on determining that the capture quality satisfies a capture condition (e.g., based at least in part on determining that the capture quality is not sufficient).

For example, the capture condition may be a threshold associated with one or more metrics. In some aspects, for example, the radar device may determine a first ratio, $P_1$, of a count of values of one associated with a subset of the truncated set of sample points corresponding to a first time period prior to the turnaround point to a length of the first time period. The radar device also may determine a second ratio, $P_2$, of values of negative one associated with a subset of the truncated set of sample points corresponding to a second time period after the turnaround point to a length of the second time period. The radar device may determine whether either of the ratios satisfies a ratio threshold, a. For example, if the radar device determines that at least one of the first ratio or the second ratio satisfies the ratio threshold (e.g., either $P_1 > \alpha$ or $P_2 > \alpha$), the radar device may discard the truncated set of sample points and select a new truncated set of sample points.

In some aspects, a low quality capture may be caused by delay. In such cases, the radar device may determine a low quality capture based at least in part on determining that the differential phase values prior to the transition point are all positive one (+1) and, after the transition point, negative one (−1).

In some aspects, a radar device may determine a delay estimation based at least in part on a slope of the phase. The delay estimation may, in some aspects, be used as an estimate of timing of the reflected FMCW signal and/or interference (e.g., coupled signal). For example, in some aspects, during a period without a transition between ramp up and ramp down, the slope in the phase may indicate the delay between the original and the reflected waveform. In some aspects, for example, the phase correlation may be determined as follows:

For $$\tau < t < \frac{T}{2}:$$

Phase $[R_{rc}(t)R_{tr}^*(t)] = -2\mu\tau t - f_c\tau + \mu\tau^2,$ which may have a positive slope $2\mu\tau$ after smoothing out the $2\pi$ jumps;

for $$\frac{T}{2} + \tau < t < T:$$

Phase$[R_{rc}(t)R_{tr}^*(t)]=2\mu\tau t-(f_c+\mu T)\tau-\mu\tau^2$, which may have a negative slope $-2\mu\tau$ after smoothing out the $2\pi$ jumps; or for $$\frac{T}{2} \leq t \leq \frac{T}{2} + \tau:$$

Phase $[R_{rc}(t)R_{tr}^*(t)] = 2\mu t^2 - 2\mu\left(\frac{T}{2} + \tau\right)t - f_c\tau + \mu\tau^2,$ which may be a quadratic form and at $$\frac{T}{2},$$

the slope is positive and large: $\mu(T-\tau)$.

In some aspects, the radar device may perform a capture quality analysis associated with the slope-based timing estimation described above. In some aspects, the slope may be estimated based on a short time series. For example, a local slope within a moving window may be estimated. The duration of the window may be dependent on the received signal strength (e.g., the higher the signal strength, the shorter the window length). The window length may have an upper limit and, in some aspects, may be fixed. A slope may be estimated based on multiple samples in the window, and if the local slopes change more than once, or change in the opposite direction from what is expected, a low quality capture may be detected. In some aspects, a local slope may have a confidence interval to indicate an accuracy level and/or confidence level associated therewith.

As indicated above, FIGS. 5A-5D are provided as examples. Other examples may differ from what is described with regard to FIGS. 5A-5D.

Figure 6:
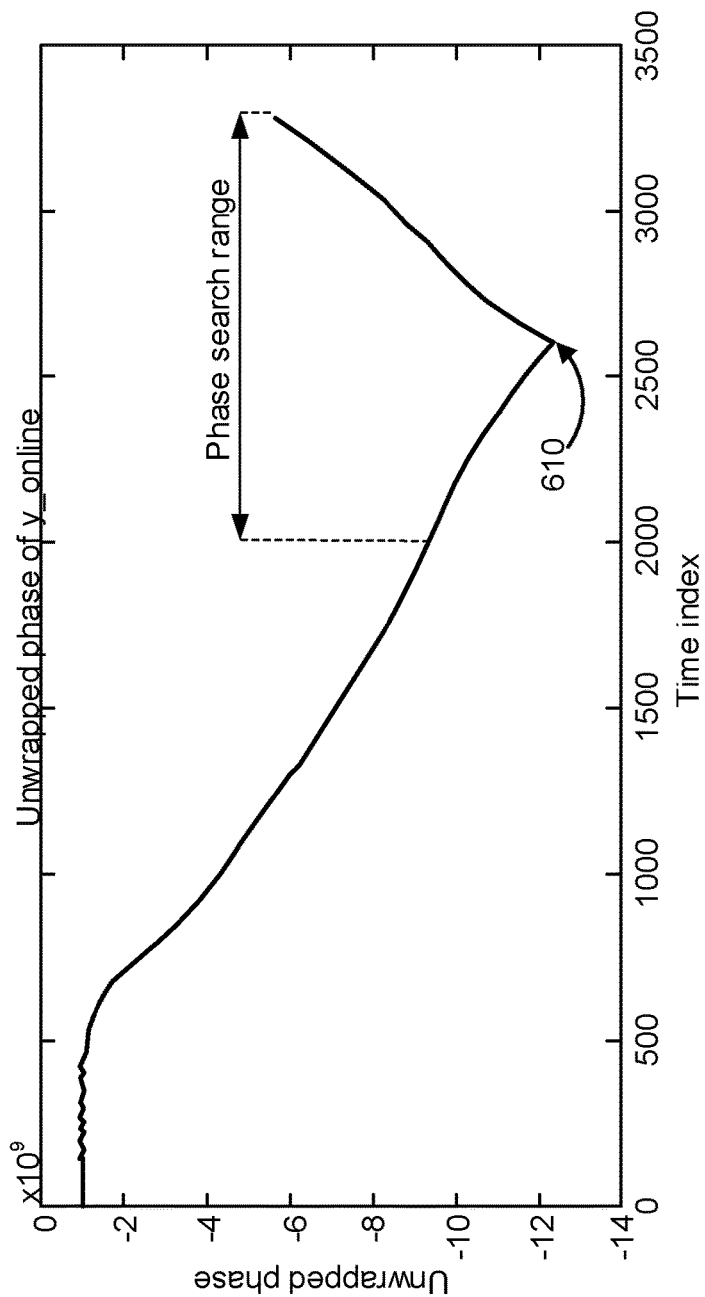

FIG. 6 is a diagram illustrating an example 600 associated with a phase based search procedure for radar detection, in accordance with the present disclosure. As shown, the example 600 illustrates a phase profile of an illustrative received signal.

The illustrated phase profile includes phases of time samples over time. As discussed above, the radar device may be configured to detect the turnaround point 610 of the phase profile and identify the end point of the up-ramp of the chirp (e.g., the phase differential transition point) based at least in part on the identified turnaround point. To reduce cycles, the phase may be computed within a range of the input signal based on the hardware. For example, as shown in FIG. 6, the phase search range may begin after the $2000^{th}$ sample.

As indicated above, FIG. 6 is provided merely as one or more examples. Other examples may differ from what is described with regard to FIG. 6.

Figure 7:
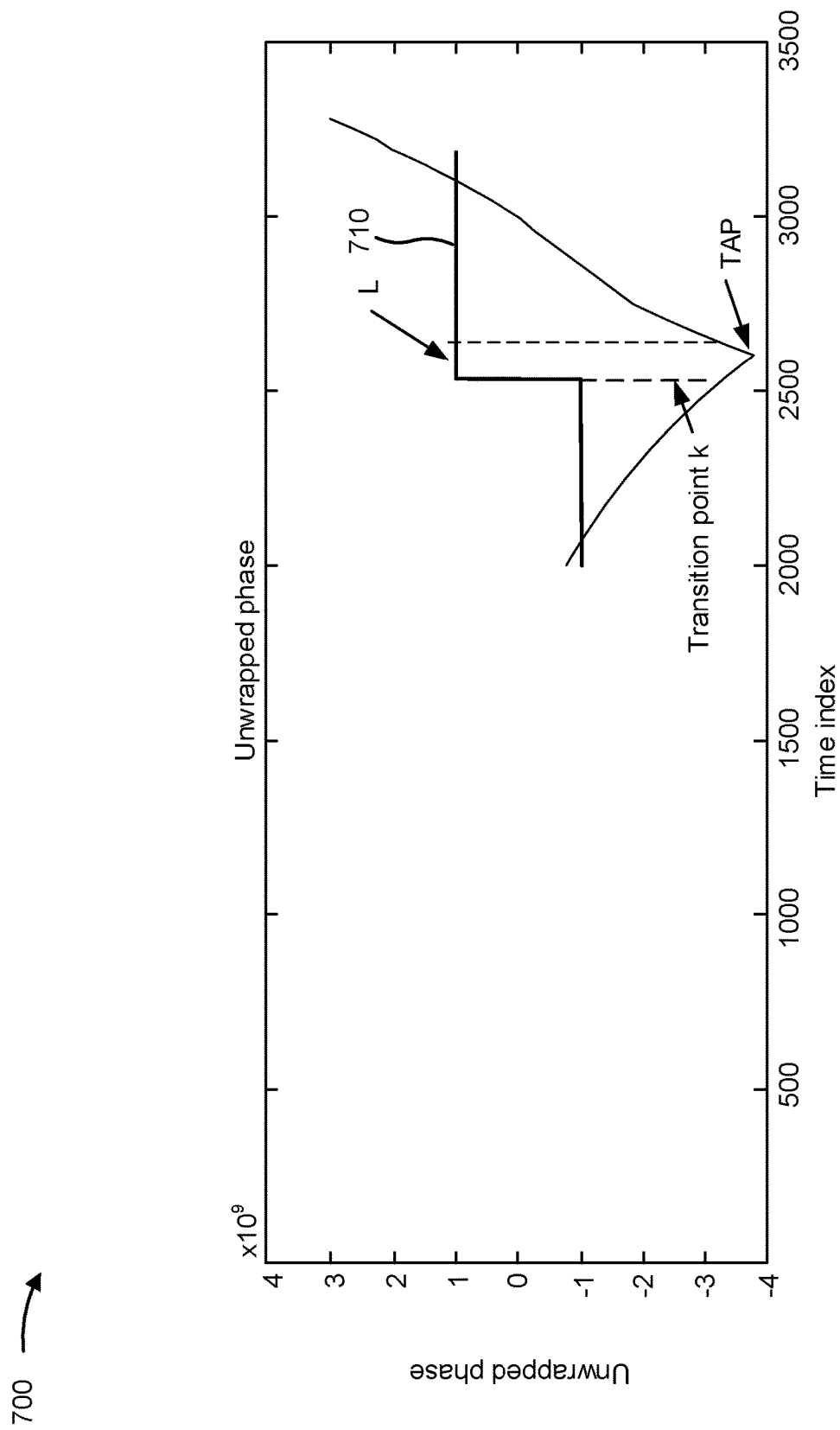

FIG. 7 is a diagram illustrating an example 700 associated with a phase based search procedure for radar detection, in accordance with the present disclosure. As shown, the example 700 illustrates a portion of the phase profile depicted in example 600.

As shown, a sliding window of length L may be used to determine the phase differential sequence of the phase profile. For example, in some aspects, a radar device may calculate the phase differential, diff(i), sequence 710 for each point indexed by i using the following equation:

$$\text{diff}(i) = \text{sign}(\text{phase}(i+L) - \text{phase}(i)),$$

which will give a sequence of values of −1 and 1. The sign flip may indicate the change of the slope. In some aspects, if k is the index of the sign flip transition point, and r is the ramp ratio, the turnaround point (TAP) may be determined as $$TAP = k + L \frac{r}{r+1}.$$

Additionally, since $r=(T-\tau)/2\tau$, $TAP \approx k+L$.

As indicated above, FIG. 7 is provided as one or more examples. Other examples may differ from what is described with regard to FIG. 7.

Figure 8:
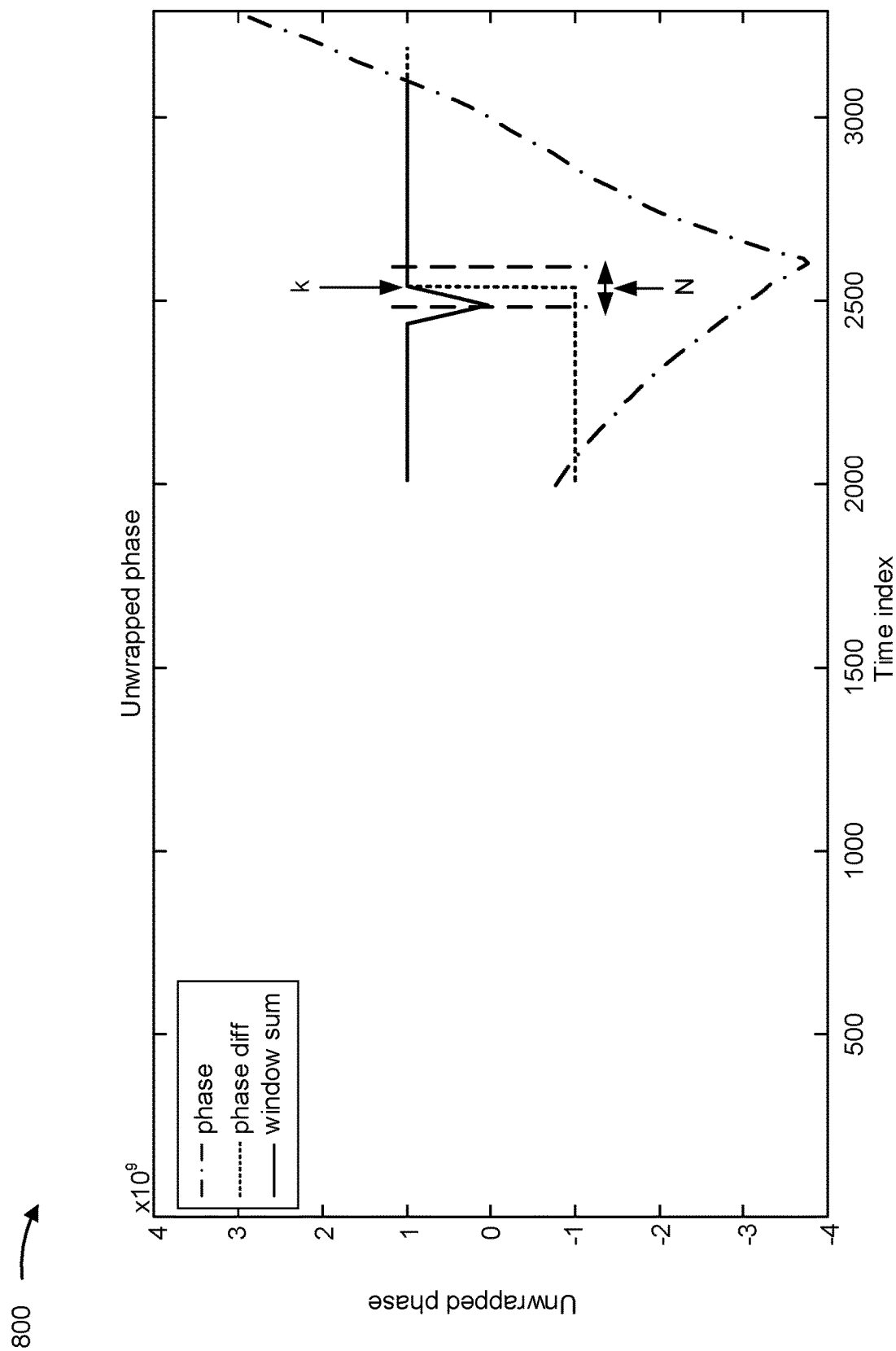

FIG. 8 is a diagram illustrating an example 800 associated with a phase based search procedure for radar detection, in accordance with the present disclosure. As shown, the example 800 illustrates a portion of the phase profile shown in FIG. 6. As shown in FIG. 8, the radar device may use a moving average window of length N to find the index of the sign flip transition point k. For example, in some aspects, the index of the sign flip transition point k may be based at least in part on a window summation (shown as "window sum"), where $$k = i + \frac{N}{2} - 1.$$

As indicated above, FIG. 8 is provided as one or more examples. Other examples may differ from what is described with regard to FIG. 8.

Figure 9:
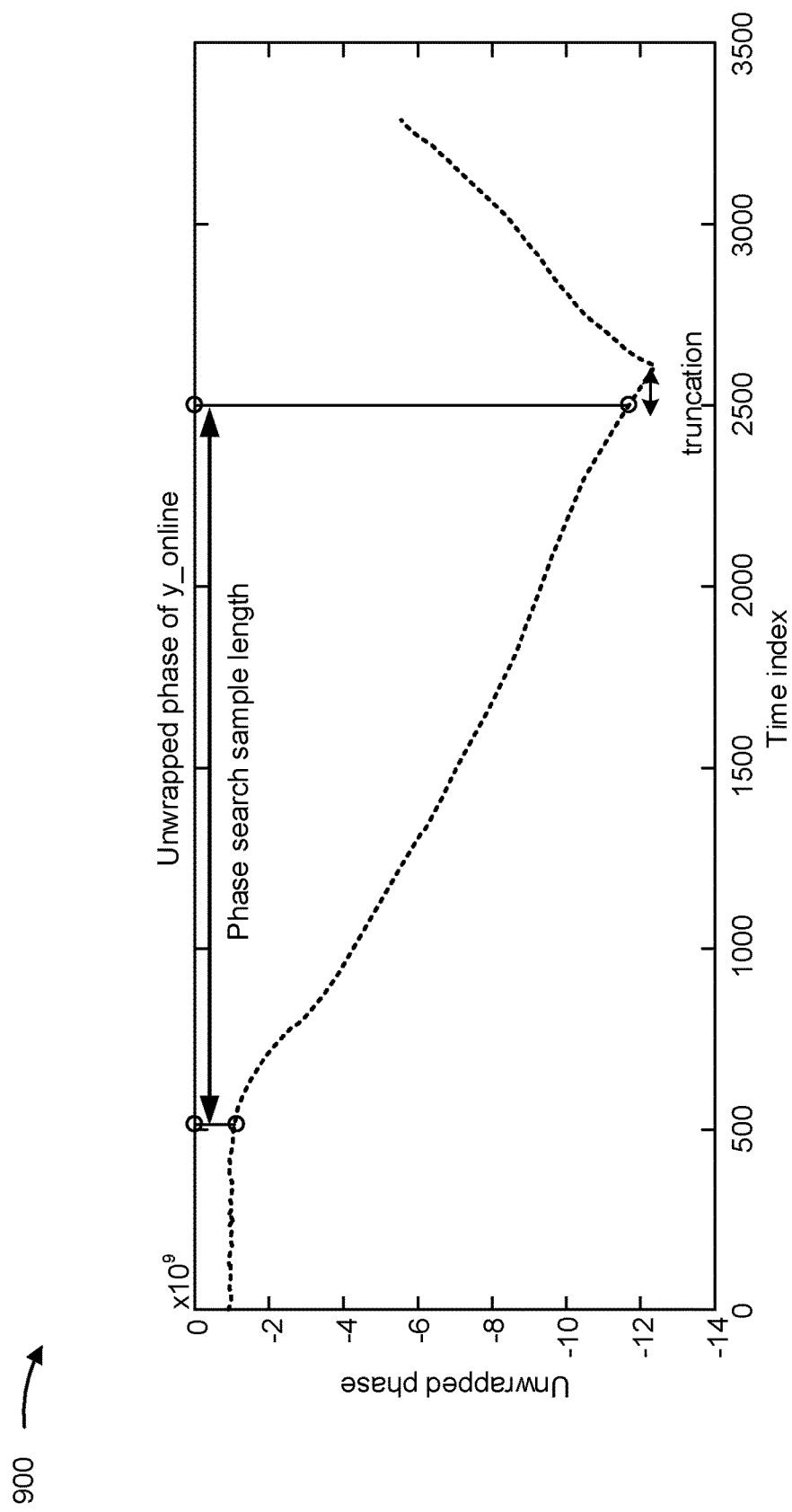

FIG. 9 is a diagram illustrating an example 900 associated with a phase based search procedure for radar detection, in accordance with the present disclosure. As shown, the example 900 illustrates extraction of a truncated set of sample points. For example, the truncated set of sample points may correspond to a phase search sample length. The set of sample points may be truncated by a number of points determined to result in an extracted set of sample points that corresponds to a full frequency ramp associated with the FMCW chirp.

As indicated above, FIG. 9 is provided as one or more examples. Other examples may differ from what is described with regard to FIG. 9.

Figure 10:
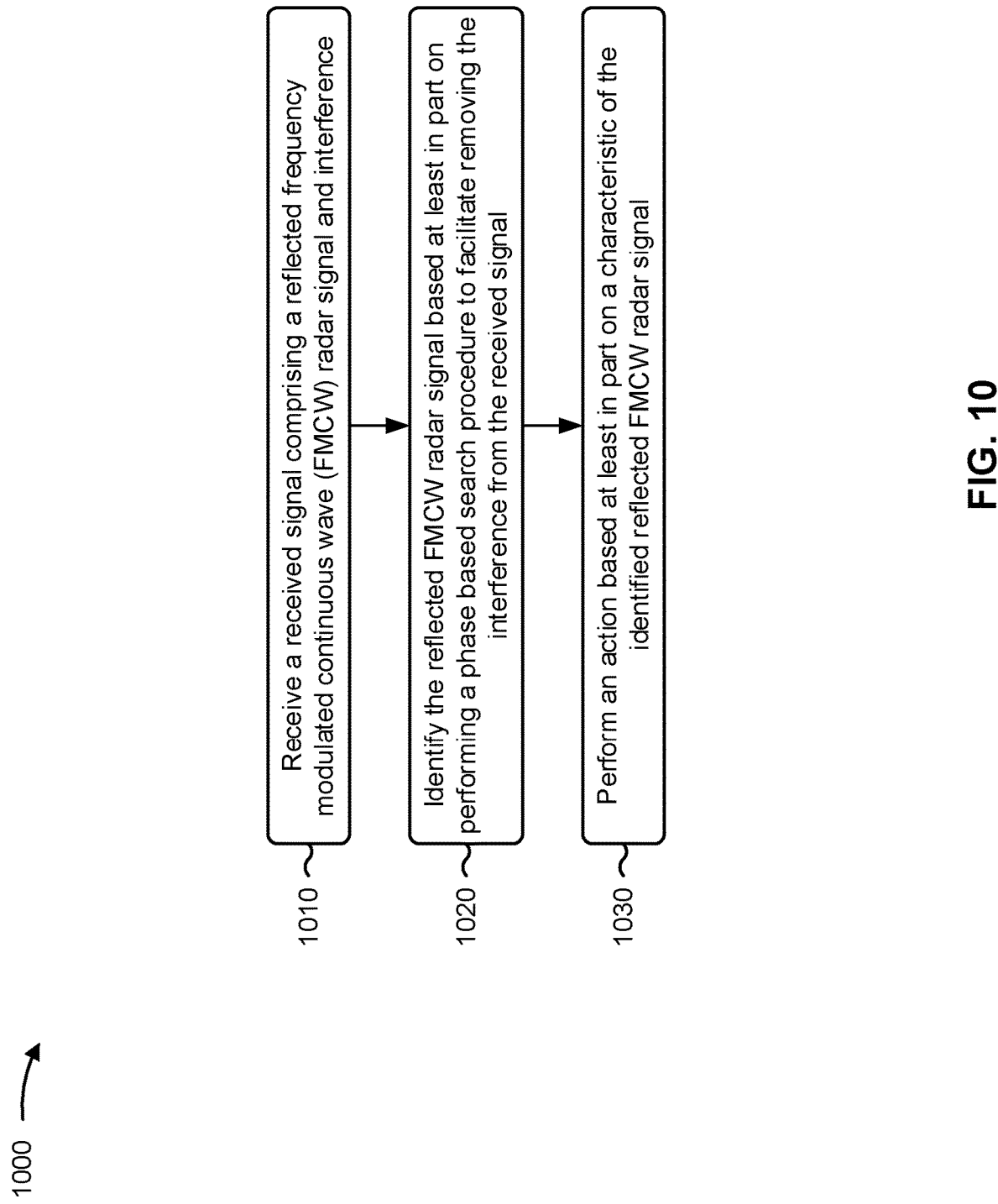
FIG. 10 is a flowchart of an example process associated with a phase based search procedure for radar detection, in accordance with the present disclosure.

FIG. 10 is a flowchart of an example process 1000 associated with phase based search procedures for radar detection. In some implementations, one or more process blocks of FIG. 10 may be performed by a radar device (e.g., radar device 105). In some implementations, one or more process blocks of FIG. 10 may be performed by another device or a group of devices separate from or including the radar device, such as a wireless communication device (e.g., wireless communication device 115), a UE (e.g., UE 120), and/or a base station (e.g., base station 125). Additionally, or alternatively, one or more process blocks of FIG. 10 may be performed by one or more components of device 200, such as processor 220, memory 230, storage component 240, input component 250, output component 260, communication interface 270, and/or phase based search component 280.

As shown in FIG. 10, process 1000 may include receiving a received signal comprising a reflected FMCW radar signal and interference (block 1010). For example, the radar device may receive a received signal comprising a reflected FMCW radar signal and interference, as described above.

As further shown in FIG. 10, process 1000 may include identifying the reflected FMCW radar signal based at least in part on performing a phase based search procedure to facilitate removing the interference from the received signal (block 1020). For example, the radar device may identify the reflected FMCW radar signal based at least in part on performing a phase based search procedure to facilitate removing the interference from the received signal, as described above.

As further shown in FIG. 10, process 1000 may include performing an action based at least in part on a characteristic of the identified reflected FMCW radar signal (block 1030). For example, the radar device may perform an action based at least in part on a characteristic of the identified reflected FMCW radar signal, as described above.

Process 1000 may include additional implementations, such as any single implementation or any combination of implementations described below and/or in connection with one or more other processes described elsewhere herein.

In a first implementation, performing the phase based search procedure comprises determining a phase profile of the received signal corresponding to a phase search range, wherein the phase profile represents a plurality of phases of a plurality of time domain samples over a time period corresponding to a transmitted FMCW radar chirp, and detecting a turnaround point of the phase profile, wherein identifying the reflected FMCW radar signal comprises identifying the reflected FMCW radar signal based at least in part on the turnaround point.

In a second implementation, alone or in combination with the first implementation, the phase search range is based at least in part on a hardware capability associated with the radar device.

In a third implementation, alone or in combination with one or more of the first and second implementations, determining the phase profile comprises determining a plurality of phase angles comprising a phase angle for each signal sample of a plurality of signal samples of the received signal, and correcting the plurality of phase angles by adding a correction factor to a phase angle of the plurality of phase angles based at least in part on determining that an absolute jump between the phase angle and an adjacent phase angle satisfies a jump tolerance threshold.

In a fourth implementation, alone or in combination with one or more of the first through third implementations, detecting the turnaround point comprises determining a phase differential sequence of the phase profile based at least in part on a sliding window, and detecting a differential transition point based at least in part on the phase differential sequence, wherein the differential transition point corresponds to the turnaround point.

In a fifth implementation, alone or in combination with the fourth implementation, the phase differential sequence comprises a sequence of values of one and negative one, and detecting the turnaround point comprises detecting the turnaround point based at least in part on a sign flip transition point index and a ramp ratio.

In a sixth implementation, alone or in combination with the sixth implementation, determining the phase differential sequence comprises determining, for a sample point corresponding to a first time instance, a sign of a difference between a phase value at the sample point and a phase value at a second time instance, wherein the second time instance is separated from the first time instance by a length of the sliding window.

In a seventh implementation, alone or in combination with the sixth implementation, the sign of the difference between the phase value at the sample point and a phase value at a second time instance is based at least in part on a relationship between the time instance, a chirp length, and a turnaround time.

In an eighth implementation, alone or in combination with the seventh implementation, the sign flip transition point index corresponds to a detection point instance that is based at least in part on a difference between half of the chirp length and the length of the sliding window.

In a ninth implementation, alone or in combination with one or more of the fifth through eighth implementations, process 1000 includes determining the sign flip transition point index based at least in part on applying a moving average window to the phase differential sequence.

In a tenth implementation, alone or in combination with one or more of the first through ninth implementations, process 1000 includes identifying a starting point of a frequency ramp corresponding to the transmitted FMCW radar chirp, wherein identifying the reflected FMCW radar signal comprises identifying the reflected FMCW radar signal based at least in part on the starting point of the frequency ramp corresponding to the transmitted FMCW radar chirp.

In an eleventh implementation, alone or in combination with the tenth implementation, identifying the starting point of the frequency ramp comprises determining an end point of the frequency ramp based at least in part on the turnaround point, and determining a time period that ends at the end point of the frequency ramp and that has a length corresponding to a length of a frequency ramp of the transmitted FMCW radar chirp.

In a twelfth implementation, alone or in combination with one or more of the first through eleventh implementations, identifying the reflected FMCW radar signal comprises extracting a truncated set of sample points based at least in part on the turnaround point.

In a thirteenth implementation, alone or in combination with the twelfth implementation, process 1000 includes determining a capture quality, which includes determining a first ratio of values of one to negative one associated with a subset of the truncated set of sample points corresponding to a time period prior to the turnaround point, determining a second ratio of values of negative one to one associated with a subset of the truncated set of sample points corresponding to a time period after the turnaround point, and determining that at least one of the first ratio or the second ratio satisfies a ratio threshold.

In a fourteenth implementation, alone or in combination with the thirteenth implementation, process 1000 includes discarding the truncated set of sample points based at least in part on determining that at least one of the first ratio or the second ratio satisfies the ratio threshold.

In a fifteenth implementation, alone or in combination with one or more of the first through fourteenth implementations, performing the action comprises determining timing information associated with the reflected FMCW radar signal.

In a sixteenth implementation, alone or in combination with the fifteenth implementation, performing the action comprises identifying the interference based at least in part on the timing associated with the reflected FMCW radar signal, and removing the interference from the received signal.

In a seventeenth implementation, alone or in combination with one or more of the first through sixteenth implementations, performing the action comprises detecting a radar target.

In an eighteenth implementation, alone or in combination with one or more of the first through seventeenth implementations, performing the action comprises determining a delay estimation based at least in part on a slope of the phase.

In a nineteenth implementation, alone or in combination with the eighteenth implementation, the delay estimation comprises an estimate of timing of at least one of the reflected FMCW radar signal or the interference.

In a twentieth implementation, alone or in combination with one or more of the eighteenth through nineteenth implementations, process 1000 includes determining the slope of the phase based at least in part on determining a plurality of local slopes of the phase; and determining a low capture quality based at least in part on at least one of determining that a first local slope of the plurality of local slopes within a moving window is different than a second local slope of the plurality of local slopes within the moving window, or determining that a difference between a first local slope of the plurality of local slopes within a moving window and a second local slope of the plurality of local slopes within the moving window indicates a change in a direction that is different than an expected direction.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method performed by a radar device, comprising: receiving a received signal comprising a reflected frequency modulated continuous wave (FMCW) radar signal and interference; identifying the reflected FMCW radar signal based at least in part on performing a phase based search procedure to facilitate removing the interference from the received signal; and performing an action based at least in part on a characteristic of the identified reflected FMCW radar signal.

Aspect 2: The method of Aspect 1, wherein performing the phase based search procedure comprises: determining a phase profile of the received signal corresponding to a phase search range, wherein the phase profile represents a plurality of phases of a plurality of time domain samples over a time period corresponding to a transmitted FMCW radar chirp; and detecting a turnaround point of the phase profile, wherein identifying the reflected FMCW radar signal comprises identifying the reflected FMCW radar signal comprises based at least in part on the turnaround point.

Aspect 3: The method of Aspect 2, wherein the phase search range is based at least in part on a hardware capability associated with the radar device.

Aspect 4: The method of either of Aspects 2 or 3, wherein determining the phase profile comprises: determining a plurality of phase angles comprising a phase angle for each signal sample of a plurality of signal samples of the received signal; and correcting the plurality of phase angles by adding a correction factor to a phase angle of the plurality of phase angles based at least in part on determining that an absolute jump between the phase angle and an adjacent phase angle satisfies a jump tolerance threshold.

Aspect 5: The method of any of Aspects 2-4, wherein detecting the turnaround point comprises: determining a phase differential sequence of the phase profile based at least in part on a sliding window; and detecting a differential transition point based at least in part on the phase differential sequence, wherein the differential transition point corresponds to the turnaround point.

Aspect 6: The method of Aspect 5, wherein the phase differential sequence comprises a sequence of values of one and negative one, and wherein detecting the turnaround point comprises detecting the turnaround point based at least in part on a sign flip transition point index and a ramp ratio.

Aspect 7: The method of Aspect 6, wherein determining the phase differential sequence comprises determining, for a sample point corresponding to a first time instance, a sign of a difference between a phase value at the sample point and a phase value at a second time instance, wherein the second time instance is separated from the first time instance by a length of the sliding window.

Aspect 8: The method of Aspect 7, wherein the sign of the difference between the phase value at the sample point and a phase value at a second time instance is based at least in part on a relationship between the time instance, a chirp length, and a turnaround time.

Aspect 9: The method of Aspect 8, wherein the sign flip transition point index corresponds to a detection point instance that is based at least in part on a difference between half of the chirp length and the length of the sliding window.

Aspect 10: The method of any of Aspects 6-9, further comprising determining the sign flip transition point index based at least in part on applying a moving average window to the phase differential sequence.

Aspect 11: The method of any of Aspects 2-10, further comprising identifying a starting point of a frequency ramp corresponding to the transmitted FMCW radar chirp, wherein identifying the reflected FMCW radar signal comprises identifying the reflected FMCW radar signal based at least in part on the starting point of the frequency ramp corresponding to the transmitted FMCW radar chirp.

Aspect 12: The method of Aspect 11, wherein identifying the starting point of the frequency ramp comprises: determining an end point of the frequency ramp based at least in part on the turnaround point; and determining a time period that ends at the end point of the frequency ramp and that has a length corresponding to a length of a frequency ramp of the transmitted FMCW radar chirp.

Aspect 13: The method of any of Aspects 2-12, wherein identifying the reflected FMCW radar signal comprises extracting a truncated set of sample points based at least in part on the turnaround point.

Aspect 14: The method of Aspect 13, further comprising determining a capture quality, comprising: determining a first ratio of values of one associated with a subset of the truncated set of sample points corresponding to a first time period prior to the turnaround point to a length of the first time period; determining a second ratio of values of negative one associated with a subset of the truncated set of sample points corresponding to a second time period after the turnaround point to a length of the second time period; and determining that at least one of the first ratio or the second ratio satisfies a ratio threshold.

Aspect 15: The method of Aspect 14, further comprising discarding the truncated set of sample points based at least in part on determining that at least one of the first ratio or the second ratio satisfies the ratio threshold.

Aspect 16: The method of any of Aspects 1-15, wherein performing the action comprises determining timing information associated with the reflected FMCW radar signal.

Aspect 17: The method of Aspect 16, wherein performing the action comprises: identifying the interference based at least in part on the timing associated with the reflected FMCW radar signal; and removing the interference from the received signal.

Aspect 18: The method of any of Aspects 1-17, wherein performing the action comprises detecting a radar target.

Aspect 19: The method of any Aspects 1-18, wherein performing the action comprises determining a delay estimation based at least in part on a slope of the phase.

Aspect 20: The method of Aspect 19, wherein the delay estimation comprises an estimate of timing of at least one of the reflected FMCW radar signal or the interference.

Aspect 21: The method of either of Aspects 19 or 20, further comprising: determining the slope of the phase based at least in part on determining a plurality of local slopes of the phase; and determining a low capture quality based at least in part on at least one of: determining that a first local slope of the plurality of local slopes within a moving window is different than a second local slope of the plurality of local slopes within the moving window, or determining that a difference between a first local slope of the plurality of local slopes within a moving window and a second local slope of the plurality of local slopes within the moving window indicates a change in a direction that is different than an expected direction.

Aspect 22: An apparatus for wireless communication at a device, comprising a processor; memory coupled with the processor; and instructions stored in the memory and executable by the processor to cause the apparatus to perform the method of one or more Aspects of Aspects 1-21.

Aspect 23: A device for wireless communication, comprising a memory and one or more processors coupled to the memory, the memory and the one or more processors configured to perform the method of one or more Aspects of Aspects 1-21.

Aspect 24: An apparatus for wireless communication, comprising at least one means for performing the method of one or more Aspects of Aspects 1-21.

Aspect 25: A non-transitory computer-readable medium storing code for wireless communication, the code comprising instructions executable by a processor to perform the method of one or more Aspects of Aspects 1-21.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a radar device, comprising:
   receiving a received signal comprising a reflected frequency modulated continuous wave (FMCW) radar signal and interference;
   detecting, based at least in part on a sign flip transition point index and a ramp ratio, a turnaround point of a phase profile of the received signal;
   identifying, based on the turnaround point, the reflected FMCW radar signal to facilitate removing the interference from the received signal; and
   performing an action based at least in part on a characteristic of the identified reflected FMCW radar signal.

2. The method of claim 1,
   wherein the phase profile corresponds to a phase search range, and
   wherein the phase profile represents a plurality of phases of a plurality of time domain samples over a time period corresponding to a transmitted FMCW radar chirp.

3. The method of claim 2, wherein the phase search range is based at least in part on a hardware capability associated with the radar device.

4. The method of claim 1, further comprising:
   determining the phase profile by correcting a plurality of phase angles by adding a correction factor to a phase angle of the plurality of phase angles, or a plurality of signal samples of the received signal, based at least in part on determining that an absolute jump between the phase angle and an adjacent phase angle satisfies a jump tolerance threshold.

5. The method of claim 1, wherein detecting the turnaround point comprises:
   determining a phase differential sequence of the phase profile based at least in part on a sliding window; and
   detecting a differential transition point based at least in part on the phase differential sequence, wherein the differential transition point corresponds to the turnaround point.

6. The method of claim 5, wherein the phase differential sequence comprises a sequence of values of one and negative one.

7. The method of claim 6, wherein determining the phase differential sequence comprises determining, for a sample point corresponding to a first time instance, a sign of a difference between a phase value at the sample point and a phase value at a second time instance,
   wherein the second time instance is separated from the first time instance by a length of the sliding window.

8. The method of claim 7, wherein the sign of the difference between the phase value at the sample point and the phase value at the second time instance is based at least in part on a relationship between a chirp length and a turnaround time.

9. The method of claim 1, wherein the sign flip transition point index corresponds to a detection point instance that is based at least in part on a difference between half of a chirp length and a length of a sliding window.

10. The method of claim 1, further comprising determining the sign flip transition point index based at least in part on applying a moving average window to a phase differential sequence of the phase profile.

11. The method of claim 2, further comprising identifying a starting point of a frequency ramp corresponding to the transmitted FMCW radar chirp,
   wherein identifying the reflected FMCW radar signal comprises identifying the reflected FMCW radar signal based at least in part on the starting point of the frequency ramp corresponding to the transmitted FMCW radar chirp.

12. The method of claim 11, wherein identifying the starting point of the frequency ramp corresponding to the transmitted FMCW radar chirp comprises:
   determining an end point of the frequency ramp corresponding to the transmitted FMCW radar chirp based at least in part on the turnaround point; and
   determining a time period that ends at the end point of the frequency ramp corresponding to the transmitted FMCW radar chirp.

13. The method of claim 1, wherein identifying the reflected FMCW radar signal comprises extracting a truncated set of sample points based at least in part on the turnaround point.

14. A method performed by a radar device, comprising:
   receiving a received signal comprising a reflected frequency modulated continuous wave (FMCW) radar signal and interference;
   detecting a turnaround point of a phase profile of the received signal;
   determining a first ratio associated with a subset of a truncated set of sample points corresponding to a first time period prior to the turnaround point to a length of the first time period;
   determining a second ratio associated with a subset of the truncated set of sample points corresponding to a second time period after the turnaround point to a length of the second time period;
   determining whether at least one of the first ratio or the second ratio satisfies a ratio threshold;
   identifying the reflected FMCW radar signal after determining whether at least one of the first ratio or the second ratio satisfies the ratio threshold; and
   performing an action based at least in part on a characteristic of the identified reflected FMCW radar signal.

15. The method of claim 14, further comprising discarding the truncated set of sample points when at least one of the first ratio or the second ratio satisfies the ratio threshold.

16. The method of claim 1, wherein performing the action comprises determining timing information associated with the reflected FMCW radar signal.

17. The method of claim 16, wherein performing the action comprises:
   identifying the interference based at least in part on the timing information associated with the reflected FMCW radar signal; and
   removing the interference from the received signal.

18. The method of claim 1, wherein performing the action comprises detecting a radar target.

19. The method of claim 1, wherein performing the action comprises determining a delay estimation based at least in part on a slope of a phase.

20. The method of claim 19, wherein the delay estimation comprises an estimate of timing of at least one of the reflected FMCW radar signal or the interference.

21. The method of claim 19, further comprising:
   determining the slope of the phase based at least in part on determining a plurality of local slopes of the phase; and
   determining a low capture quality based at least in part on at least one of:
      determining that a first local slope of the plurality of local slopes within a moving window is different than a second local slope of the plurality of local slopes within the moving window, or
      determining that a difference between the first local slope of the plurality of local slopes within the moving window and the second local slope of the plurality of local slopes within the moving window indicates a change in a direction that is different than an expected direction.

22. A radar device for wireless communication, comprising:
   a memory; and
   one or more processors, coupled to the memory, configured to:
      receive a received signal comprising a reflected frequency modulated continuous wave (FMCW) radar signal and interference;
      detect, based at least in part on a sign flip transition point index and a ramp ratio, a turnaround point of a phase profile of the received signal;
      identify, based on the turnaround point, the reflected FMCW radar signal to facilitate removing the interference from the received signal; and
      perform an action based at least in part on a characteristic of the identified reflected FMCW radar signal.

23. The radar device of claim 22,
   wherein the phase profile corresponds to a phase search range, and
   wherein the phase profile represents a plurality of phases of a plurality of time domain samples over a time period corresponding to a transmitted FMCW radar chirp.

24. The radar device of claim 23, wherein the phase search range is based at least in part on a hardware capability associated with the radar device.

25. The radar device of claim 23, wherein the one or more processors are configured to:
   determine the phase profile by correcting a plurality of phase angles by adding a correction factor to a phase angle of the plurality of phase angles, or a plurality of signal samples of the received signal, based at least in part on determining that an absolute jump between the phase angle and an adjacent phase angle satisfies a jump tolerance threshold.

26. The radar device of claim 22, wherein the one or more processors, to detect the turnaround point, are configured to:
   determine a phase differential sequence of the phase profile based at least in part on a sliding window; and
   detect a differential transition point based at least in part on the phase differential sequence, wherein the differential transition point corresponds to the turnaround point.

27. The radar device of claim 26, wherein the phase differential sequence comprises a sequence of values of one and negative one.

28. The radar device of claim 27, wherein determining the phase differential sequence comprises determining, for a sample point corresponding to a first time instance, a sign of a difference between a phase value at the sample point and a phase value at a second time instance,
   wherein the second time instance is separated from the first time instance by a length of the sliding window.

29. The radar device of claim 28, wherein the sign of the difference between the phase value at the sample point and the phase value at the second time instance is based at least in part on a relationship between a chirp length and a turnaround time.

30. The radar device of claim 22, wherein the sign flip transition point index corresponds to a detection point instance that is based at least in part on a difference between half of a chirp length and a length of a sliding window.

31. The radar device of claim 22, wherein the one or more processors are further configured to determine the sign flip transition point index based at least in part on applying a moving average window to a phase differential sequence of the phase profile.

32. The radar device of claim 23, wherein the one or more processors are further configured to identify a starting point of a frequency ramp corresponding to the transmitted FMCW radar chirp,
wherein, to identify the reflected FMCW radar signal, the one or more processors are configured to identify the reflected FMCW radar signal based at least in part on the starting point of the frequency ramp corresponding to the transmitted FMCW radar chirp.

33. The radar device of claim 32, wherein the one or more processors, to identify the starting point of the frequency ramp corresponding to the transmitted FMCW radar chirp, are configured to:
determine an end point of the frequency ramp corresponding to the transmitted FMCW radar chirp based at least in part on the turnaround point; and
determine a time period that ends at the end point of the frequency ramp corresponding to the transmitted FMCW radar chirp.

34. The radar device of claim 22, wherein the one or more processors, to identify the reflected FMCW radar signal, are configured to extract a truncated set of sample points based at least in part on the turnaround point.

35. A radar device for wireless communication, comprising:
a memory; and
one or more processors, coupled to the memory, configured to:
receive a received signal comprising a reflected frequency modulated continuous wave (FMCW) radar signal and interference;
detect a turnaround point of a phase profile of the received signal;
determine a first ratio associated with a subset of a truncated set of sample points corresponding to a first time period prior to the turnaround point to a length of the first time period;
determine a second ratio associated with a subset of the truncated set of sample points corresponding to a second time period after the turnaround point to a length of the second time period;
determine whether at least one of the first ratio or the second ratio satisfies a ratio threshold;
identify the reflected FMCW radar signal after determining whether at least one of the first ratio or the second ratio satisfies the ratio threshold; and
perform an action based at least in part on a characteristic of the identified reflected FMCW radar signal.

36. The radar device of claim 35, wherein the one or more processors are further configured to discard the truncated set of sample points when at least one of the first ratio or the second ratio satisfies the ratio threshold.

37. The radar device of claim 22, wherein the one or more processors, to perform the action, are configured to determine timing information associated with the reflected FMCW radar signal.

38. The radar device of claim 37, wherein the one or more processors, to perform the action, are configured to:
identify the interference based at least in part on the timing information associated with the reflected FMCW radar signal; and
remove the interference from the received signal.

39. The radar device of claim 22, wherein the one or more processors, to perform the action, are configured to detect a radar target.

40. The method of claim 14,
wherein the phase profile corresponds to a phase search range, and
wherein the phase profile represents a plurality of phases of a plurality of time domain samples over a time period corresponding to a transmitted FMCW radar chirp.

41. The method of claim 40, wherein the phase search range is based at least in part on a hardware capability associated with the radar device.

42. The method of claim 14, further comprising:
determining the phase profile by correcting a plurality of phase angles by adding a correction factor to a phase angle of a plurality of phase angles, or a plurality of signal samples of the received signal, based at least in part on determining that an absolute jump between the phase angle and an adjacent phase angle satisfies a jump tolerance threshold.

43. The method of claim 14, wherein detecting the turnaround point comprises:
determining a phase differential sequence of the phase profile based at least in part on a sliding window; and
detecting a differential transition point based at least in part on the phase differential sequence, wherein the differential transition point corresponds to the turnaround point.

44. The method of claim 14, wherein performing the action comprises at least one of:
determining timing information associated with the reflected FMCW radar signal,
detecting a radar target, or
determining a delay estimation based at least in part on a slope of a phase.

45. The radar device of claim 35,
wherein the phase profile corresponds to a phase search range, and
wherein the phase profile represents a plurality of phases of a plurality of time domain samples over a time period corresponding to a transmitted FMCW radar chirp.

46. The radar device of claim 45, wherein the phase search range is based at least in part on a hardware capability associated with the radar device.

47. The radar device of claim 35, further comprising:
determining the phase profile by correcting a plurality of phase angles by adding a correction factor to a phase angle of a plurality of phase angles, or a plurality of signal samples of the received signal, based at least in part on determining that an absolute jump between the phase angle and an adjacent phase angle satisfies a jump tolerance threshold.

48. The radar device of claim 35, wherein detecting the turnaround point comprises:
determining a phase differential sequence of the phase profile based at least in part on a sliding window; and
detecting a differential transition point based at least in part on the phase differential sequence, wherein the differential transition point corresponds to the turnaround point.

49. The radar device of claim 35, wherein the one or more processors, to perform the action, are configured to at least one of:
- determine timing information associated with the reflected FMCW radar signal,
- detecting a radar target, or
- determining a delay estimation based at least in part on a slope of a phase.

50. The radar device of claim 35, wherein the one or more processors, to perform the action, are configured to at least one of:
- determine timing information associated with the reflected FMCW radar signal;
- identify the interference based at least in part on the timing information associated with the reflected FMCW radar signal; and
- remove the interference from the received signal.

* * * * *